Oct. 24, 1950 H. H. WALKER 2,526,784
STRAINER
Filed Aug. 15, 1946 2 Sheets-Sheet 1

Inventor
Harlan H. Walker
By Fishburn & Mullendore
Attorneys

Oct. 24, 1950 H. H. WALKER 2,526,784
STRAINER
Filed Aug. 15, 1946 2 Sheets-Sheet 2
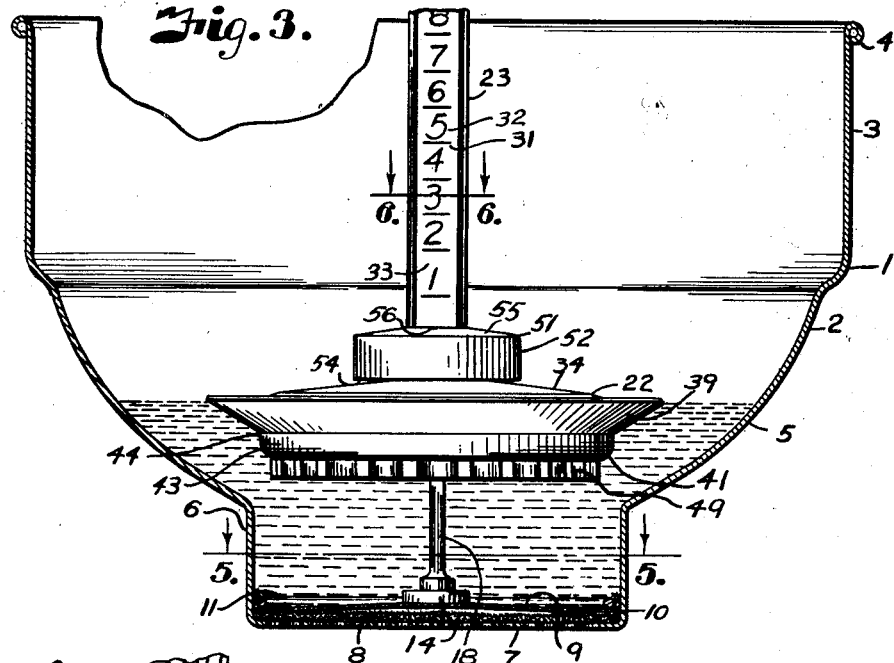
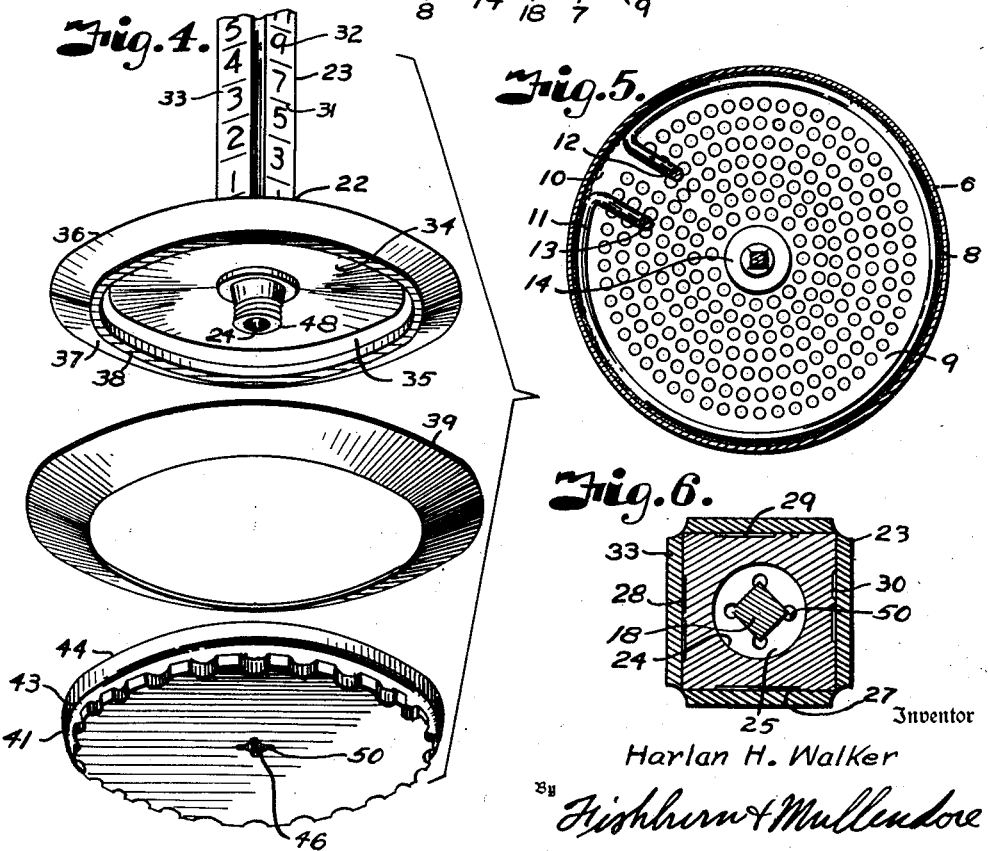
Inventor
Harlan H. Walker
By Fishburn & Mullendore
Attorneys Patented Oct. 24, 1950

2,526,784

UNITED STATES PATENT OFFICE 2,526,784

STRAINER

Harlan H. Walker, Butler, Mo.

Application August 15, 1946, Serial No. 690,756

10 Claims. (Cl. 210—156)

This invention relates to strainers such as used in straining milk and has for its principal object to provide a strainer with measuring apparatus for determining the amount of milk poured into the strainer; for example, a dairyman desires a record of the amount of milk obtained from a cow at each milking so as to determine the most heavy and profitable producers and to enable culling out of the poor producers. Such a record is also used as a basis for the amount of feed required by the animal to maintain maximum milk production.

It is the principal objects of the present invention to provide a more convenient and simple equipment for measuring milk incidental to the straining thereof by providing a milk strainer with measuring means so that after a cow is milked, the milk is poured directly from the milk pail or milking machine into the strainer, measured and released into a collecting receptacle.

Other objects of the invention are to provide a measuring means by which a given quantity of milk can be measured without interference by the foam; to provide a measuring device including a valve mechanism that positively seals the opening to the screen element of the strainer, which is readily actuated to release the milk after measuring, which automatically retains its open position during flow of milk through the screen element into the collecting container, and which automatically seats for measuring another batch of milk when the measured milk has passed through the strainer; to provide a measuring mechanism that can be utilized for loosening milk solids and other sediment from the screen elements of the strainer; and to provide a strainer with a measuring mechanism that is easily sterilized and kept in sanitary condition.

It is also an object of the invention to provide a measuring device which measures the quantity and weight of the milk.

In accomplishing these and other objects of the invention, I have provided an improved strainer, the preferred form of which is illustrated in the accompanying drawings wherein:

Fig. 3 is a similar section through the strainer but showing the measuring mechanism in elevation, and the valve in unseated position and floating on the milk to allow the milk to flow through the screen element of the strainer.

Fig. 4 is a perspective view of the parts of the measuring mechanism in disassembled spaced relation to better illustrate the construction.

Fig. 5 is a cross section through the strainer on the line 5—5 of Fig. 3.

Fig. 6 is an enlarged cross section through the scale or measuring rod of the measuring mechanism on the line 6—6 of Fig. 3.

Figure 1:
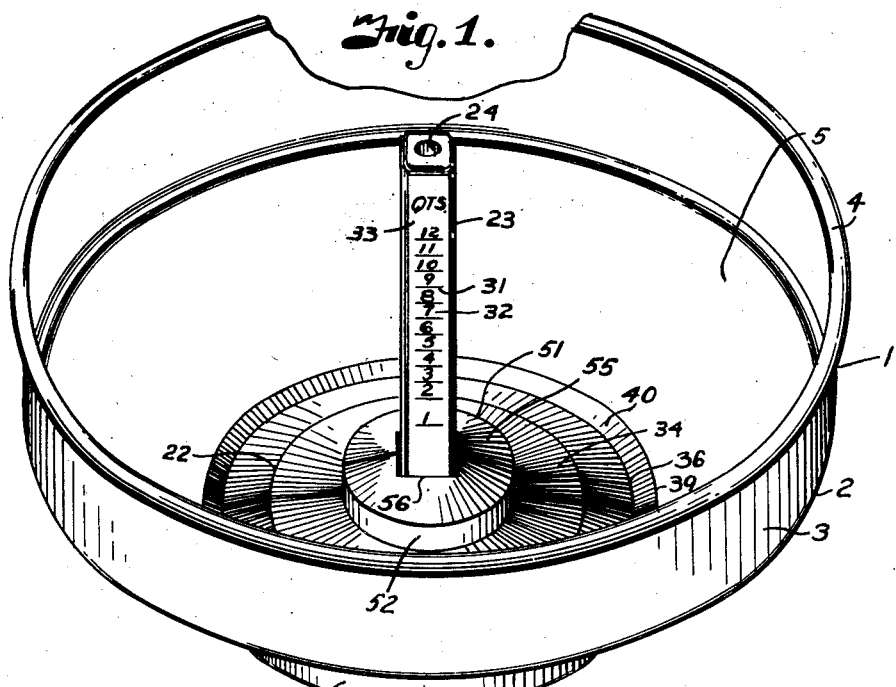
Fig. 1 is a perspective view of a strainer equipped with a measuring mechanism embodying the features of the present invention.

Referring more in detail to the drawings:

1 designates a strainer equipped with a measuring mechanism embodying the features of the present invention. The strainer includes a substantially bowl-shaped body 2 having an upper wall portion 3 provided with a rolled rim 4 and a lower inwardly curving portion 5 terminating in a depending neck or collar 6 of substantially cylindrical shape and closed at its lower end by a perforated bottom 7 which supports the straining element 8, preferably of cloth. The screening element is retained in contact with the circumferential portion of the bottom 7 by a perforated disk 9. The retaining disk 9 is of inverted dish shape and has its marginal edge 10 pressing on the periphery of the straining element 8 to effect a seal with the inner face of the neck 6 and with the marginal portion of the bottom 7, while the central portion is spaced from the straining element to pass the milk freely therethrough.

The retainer disk is secured in position by an expanding ring 11 provided with inwardly extending finger gripping terminals 12 and 13 on the ends thereof. The ring 11 is normally of larger diameter than the inner diameter of the neck 6 so that it must be contracted when placed in position by pressing the finger grips together. Upon release, the ring grips the inner circumferential face of the neck of the strainer to retain the straining element and support the retaining disk rigidly within the strainer.

The structure thus far described is substantially conventional of the type of milk strainers that are applied in the neck of a milk can or other collecting receptacle (not shown) so that milk can be poured directly from the milking pail into the strainer for flow through the straining element into the receptacle.

In carrying out the present invention I provide the strainer with a measuring mechanism whereby the milk poured into the strainer is measured prior to discharge through the straining element, as now to be described.

Figure 2:
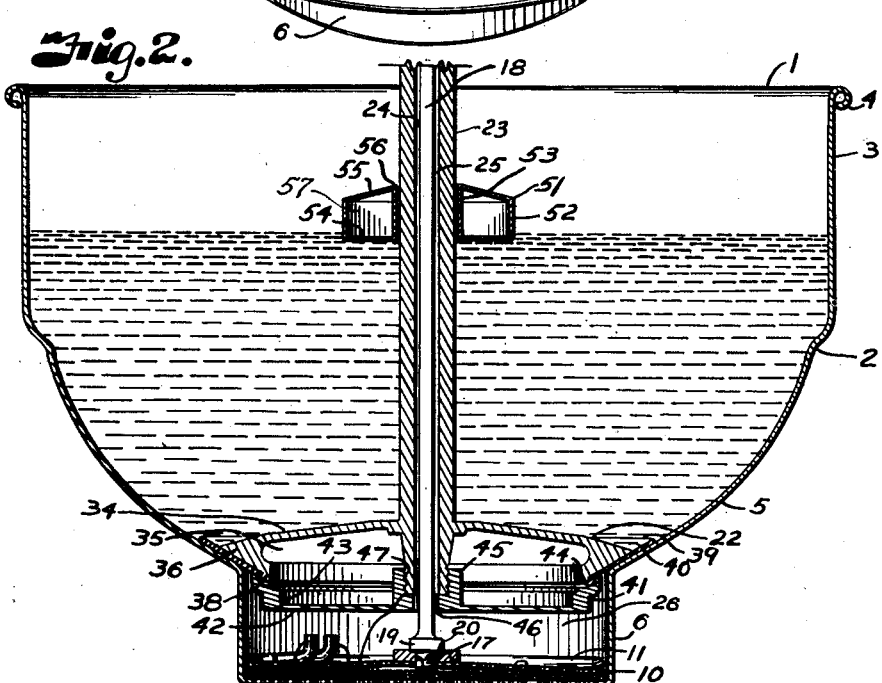
Fig. 2 is a central vertical section through the strainer and measuring mechanism showing the float valve closed and in position for measuring a quantity of milk.

Fixed to the central portion of the retaining disk is a collar 14 having an internally threaded axial opening 15 registering with a central opening 16 of the disk 9 for mounting the threaded stem 17 of a guide rod 18 that extends upwardly through the strainer body with its upper end terminating slightly above the rim 4. The guide rod is preferably provided with a stop collar or flange 19 surrounding the threaded stem 17 for forming a stop shoulder 20 to seat upon the face of the collar 14 and thereby prevent turning movement of the guide rod 18 in the retaining disk 9. The measuring mechanism includes a float-type valve 22 carrying a measuring stem or rod 23. The stem 23 has an axial bore 24 of larger diameter than the guide rod to provide a passageway 25 therearound for venting the space 26 between the valve 22 and screen retaining disk 9. The exterior of the measuring stem may be of suitable shape to accommodate the required number of scales on the sides thereof. For example, in the illustrated instance the measuring stem is of rectangular cross section and has scale faces 27, 28, 29 and 30, each provided with graduations 31 and related numerals 32. The graduations 31 and numerals 32 may be stamped within the sides of the measuring stem or they may be inlaid in strip form and covered by strips of transparent material 33 that are sealed homogeneously to the respective faces of the measuring rod as shown in Fig. 6. The measuring stem preferably extends a short distance above the guide rod when in measuring position. The valve 22 includes a disk portion 34 which forms the upper side of a float chamber 35 in said valve. The disk is of sufficient diameter to overlap the marginal portion of the strainer wall immediately encircling the neck 6 as best shown in Fig. 2. The disk 34 is slightly coned and may be formed integrally with the measuring rod. The disk also has an annular flange 36 on the air chamber side that is provided with an annular tapering face 37 substantially conforming to the angle of the wall portion of the strainer as shown in Fig. 2.

The tapering face preferably extends inwardly across the wall to the neck and terminates in an angularly extending rib 38. Seated against the tapered face 37 in encircling relation with the rib 38 is a gasket ring 39 formed of a resilient material such as rubber and which is of sufficient width to project slightly beyond the circumference of the disk 34 to provide a resilient annular lip 40 that is adapted to maintain a positive seal with the inner face of the strainer bowl. The inner marginal edge of the gasket ring is clamped in engagement with the disk 34 by a cap member 41 including a substantially disk-like web portion 42 having a circumferential flange 43 terminating in an outwardly offset annular clamping rim 44. The central portion of the cap is provided with an axial boss 45 having an opening 46 therethrough for passing the guide rod.

The opening through the boss is provided with an internally threaded counterbore 47 on the flange side for threading the cap onto a threaded boss 48 to draw the clamping rim 44 into sealing contact with the inner marginal edge of the gasket.

To facilitate manipulation of the cap and to permit ready removal thereof for cleansing purposes, the lower portion of the cap may be provided with a periphery 49 shaped to promote gripping thereof with the hands when screwing the cap onto the disk member of the float. When the cap is placed and a seal effected with the gasket, the air-tight compartment or float chamber 35 is capable of buoying the valve in the milk when the valve is unseated.

In order to prevent rotation of the measuring stem and valve on the guide rod, the guide rod is preferably of polygonal cross section, that is, it may be formed of a square rod as shown in Fig. 6 and the opening 46 through the boss 45 is of corresponding cross section to form a sliding non-rotative connection therebetween. The space 26 is connected with the space surrounding the guide rod, by ports 50 at the corners of the opening 46.

Fresh milk when poured into the strainer carries a considerable amount of foam so that the foam would interfere with reading of the level of the liquid milk upon the measuring rod and to overcome this difficulty, I provide a float ring 51 for floating on top of the liquid milk and which is of sufficient height so that it projects above the level of foam. The float illustrated includes an annular wall 52 and an inner wall 53 substantially conforming in shape to the cross sectional shape of the measuring rod. The walls carry a bottom closure ring 54 and a conical top ring 55, the apical edges 56 of which terminate at the scales of the measuring stem for use as an indicator. The chamber 57 within the float ring is completely sealed and the material from which the float ring is formed is relatively light so that the float is carried substantially up on the surface of the liquid milk and moves therewith through any foam that may be collected in the strainer.

The scales on two adjacent sides of the measuring stem are graduated respectively in quarts and pints so that quarts and pints may be viewed simultaneously from both scales. The other adjacent scales are preferably marked in pounds and ounces respectively to ascertain the weight of the milk.

In assembling the strainer preparatory to straining milk, the straining element is placed in position followed by the retaining disk 9 which carries the guide rod. The clamping ring 11 is then inserted and allowed to expand to hold the parts in position. The assembled measuring device is then placed over the upper end of the guide rod so that the gasket 39 on the float seats upon the wall of the strainer in encircling relation with the neck 6 to form a seal therebetween. The neck of the strainer is then inserted within the milk collecting receptacle. When the cow has been milked the milk is poured from the milking pail into the strainer, and the float ring 54 rises upwardly on the measuring stem to indicate the weight or volume of the milk which may be read on the scales by noting the edges 56 of the float relative to the scales.

The valve remains seated under weight of the milk and after taking the reading, the measuring stem is lifted to unseat the valve thereof whereupon the milk flows under the valve and the valve being buoyant in the milk automatically rises through the milk to float thereon while the milk is running thereunder through the straining element. As the level drops the float moves toward seating position and when all of the milk has run out of the strainer, the gasket of the valve again seats upon the wall of the strainer to effect a seal. The liquid is allowed to empty the space 26, by admission of air through the top of the measuring tube.

All milk contains solids and matter tending to block the flow through the straining element. The lodged material may be readily removed by pushing downwardly on the stem to seat the valve. This is readily accomplished as the space 26 vents through the passageway 25. Downward movement of the valve applies pressure upon the strainer element. The thumb is then placed over the upper end of the bore 24 in the measuring stem to cut off the vent. This action suspends the flow of milk through the straining element and upon a quick upward movement of the stem the valve and milk in the space 26 act as a piston to produce a vacuum above the straining element which is immediately released by air flow upwardly through the straining elements which dislodges solids clogging the straining element. By working the stem up and down in this manner alternate pressure and suction is effected within the space 26 to loosen the clogging material.

The straining element of the strainer is readily accessible by sliding the measuring mechanism upwardly over the top of the guide tube and then the clamping ring is readily released by reaching through the open top of the strainer and grasping the terminal ends thereof and drawing the terminal ends thereof together to contract the ring sufficiently so that it can be removed from the neck of the strainer. The retaining disk and straining element may then be withdrawn to permit cleaning and sterilizing of the parts. If desired, the float may be disassembled and the measuring float slide off the upper end of the measuring tube to facilitate cleaning and sterilization of these parts. After sterilization the parts are reassembled as previously described.

From the foregoing it is obvious that I have provided a strainer with measuring means that is of simple and positive action and which is well adapted for use by the small dairyman.

What I claim and desire to secure by Letters Patent is:

1. A device of the character described including a container having a funnel-like body having a bottom outlet, a screening element covering said outlet, a perforated retaining member having marginal engagement with said straining element, a retaining ring frictionally engaging the container and said perforated retaining member, a guide rod fixed to the retaining member and extending upwardly in the container, a valve reciprocable on the guide rod and having a seating face for engaging a part of the container that includes the bottom outlet to close said bottom outlet, a tubular stem carried by the valve and having graduations along the length of said stem, said stem being sleeved over the guide rod, an indicator slidably supported on the tubular stem and adapted to float upon liquid poured into the container when the valve is seated to indicate the amount of liquid in said container.

2. A device of the character described including a container having a funnel-like body provided with a bottom outlet, a screening element covering said outlet, a perforated retaining member having marginal engagement with said straining element, a retaining ring frictionally engaging the container and said retaining member, a guide rod fixed to the retaining member, a valve reciprocable on the guide rod and having a seating face for engaging a part of the container that includes the bottom outlet to close said bottom outlet, a stem carried by the valve and having graduations along the length of said stem, an indicator slidably supported on the stem and adapted to float upon liquid poured into the container when the valve is seated to indicate the amount of liquid in said funnel-like body, said valve having an air chamber for buoying the valve in said liquid when the valve is unseated to discharge the liquid through said straining element.

3. A device of the character described including a funnel-like body having a bottom outlet, a screening element, means retaining the screening element in covering relation with said outlet, a guide carried by the retaining means, and a valve slidably mounted on the guide and having a flexible gasket for contacting a part of said body circumferentially of the outlet for closing flow through said outlet.

4. A device of the character described including a funnel-like body having a bottom outlet, a screening element, means retaining the screening element in covering relation with said outlet, a guide carried by the retaining means, a valve slidably mounted on the guide and having a flexible gasket for contacting a part of said body circumferentially of the bottom outlet for closing flow through said outlet, and a tubular stem connected with the valve and reciprocable on the guide to unseat said valve.

5. A device of the character described including a funnel-like body having a bottom outlet, a screening element, means retaining the screening element in covering relation with said outlet, a guide carried by the retaining means, a valve slidably mounted on the guide and having a flexible gasket for contacting a part of said body circumferentially of the bottom outlet for closing flow through said outlet, a tubular stem carried by the valve and reciprocable therewith on the guide rod, said tubular stem having scale markings for indicating volume of a liquid when poured into said funnel-like body, and a float slidable on the stem and cooperating with the scale markings on the stem.

6. A device of the character described including a funnel-like body having an outlet and a valve seat encircling the outlet, a guide rod, means supporting the guide rod coaxial of said seat, a valve having non rotatable sliding support on the guide rod including a disk-like body member having an annular gasket seating face, a gasket engaging said face and having an annular sealing lip adapted to engage said seat, a cap member for clamping the gasket to said face and cooperating with the disk-like body to form a closed air chamber in said valve, and a stem having an axial bore extending through the valve and of larger diameter than the guide rod for providing an air flow passageway therebetween.

7. A device of the character described including a funnel-like body having a bottom outlet, a screening element, means retaining the screening element in covering relation with said outlet, a guide rod carried by the retaining means, a valve slidably mounted on the guide rod and having a flexible gasket for sealing contact with said body circumferentially of the body outlet for closing flow through said outlet, and a stem carried by the valve and having an axial bore for loosely passing the valve and stem over the guide rod and for providing an air passageway to vent space between the valve and said screening element for allowing the valve to seat.

8. A device of the character described including a funnel-like body having a bottom outlet and a valve seat encircling the outlet, a guide, means supporting the guide coaxial of said seat, a valve including a disk-like body member having an annular gasket seating face, a gasket engaging said face and adapted to engage the seat, a cap member for clamping the gasket to said face and cooperating with the disk-like body to form a closed air chamber in said valve, and a stem having an axial bore extending through the valve for mounting the valve on the guide, and a measuring float slidable on the guide stem.

9. A liquid measuring and straining device including, an open top funnel like body having a bottom outlet of substantially large flow capacity relatively to the capacity of said funnel like body, straining means completely covering said bottom outlet for removing foreign matter contained with liquid that is poured into said body, a part of said container above said screening means forming an annular valve seat completely encircling the screening means and spaced therefrom, a valve having a buoyant body portion substantially conforming in area with the area of the straining means and having an annular valve face encircling the buoyant portion to engage the valve seat, a stem carried by said valve and extending upwardly in said funnel like body to a point above the maximum level of liquid that may be attained in said funnel like body when the valve is seated, and means on said stem to indicate the level of liquid in said funnel like body.

10. A liquid measuring and straining device including, an open top funnel like body having a bottom outlet of substantially large flow capacity relative to the capacity of said funnel like body, straining means completely covering said bottom outlet for removing foreign matter contained with liquid that is poured into said body, a part of said container above said screening means forming an annular valve seat completely encircling the screening means and spaced therefrom, a valve having a buoyant body portion substantially conforming in area with the area of the straining means and having an annular valve face encircling the buoyant portion to engage the valve seat, a stem carried by said valve and extending upwardly in said funnel like body to a point above the maximum level of liquid that may be attained in said funnel like body when the valve is seated, and means on said stem to indicate the level of liquid in said funnel like body, said stem having an air passage extending downwardly therethrough and in connection with the space between the straining means and valve for establishing atmospheric pressure in said space.

HARLAN H. WALKER.

REFERENCES CITED

The following references are of record in the file of this patent:

UNITED STATES PATENTS

| Number | Name | Date |
|---|---|---|
| 519,307 | Perkins | May 1, 1894 |
| 1,287,974 | Gudges | Dec. 17, 1918 |
| 1,344,663 | Waldrep | June 29, 1920 |
| 1,695,306 | Wiemer | Dec. 18, 1928 |
| 2,282,767 | Peterson | May 12, 1942 |
| 2,466,158 | Salino | Apr. 5, 1949 |